United States Patent

[11] 3,564,181

[72] Inventors William W. Chirota
Dearborn;
Carl G. Rigge, Dearborn Heights; Thomas Shewchuck, Dearborn, Mich.
[21] Appl. No. 816,253
[22] Filed Apr. 15, 1969
[45] Patented Feb. 16, 1971
[73] Assignee Ford Motor Company
Dearborn, Mich.

[54] SINGLE PLANE ELECTRIC REVERSING SWITCH FOR MOTOR OPERATION CONTROL
2 Claims, 6 Drawing Figs.

[52] U.S. Cl............................................. 200/164, 200/1
[51] Int. Cl............................................. H01h 1/36
[50] Field of Search..................................... 200/1
(RV), 153.10, 164, 16, 166 (CRC); 318/280
(Inquired)

[56] References Cited
UNITED STATES PATENTS
1,556,828 10/1925 Wyman.................. 200/1 RV
3,271,536 9/1966 Schink.................... 200/16

*Primary Examiner*—Robert K. Schaefer
*Assistant Examiner*—H. J. Hohauser
*Attorneys*—John R. Faulkner and E. Dennis O'Connor ABSTRACT: An electric switch having a substantially planar configuration and adapted to interconnect a current source and a reversible electric motor for multidirectional motor operation and to electrically connect the motor for dynamic braking upon the cessation of current flow to the motor. Flat conductors connected to the current source and motor converge upon and are uniquely arranged about a point on a circuit board. Plural conductive bridging elements mounted on a manually movable switch actuator are movable to plural switch positions in intimate contact with the conductors to effect desired electrical interconnection of the conductors.

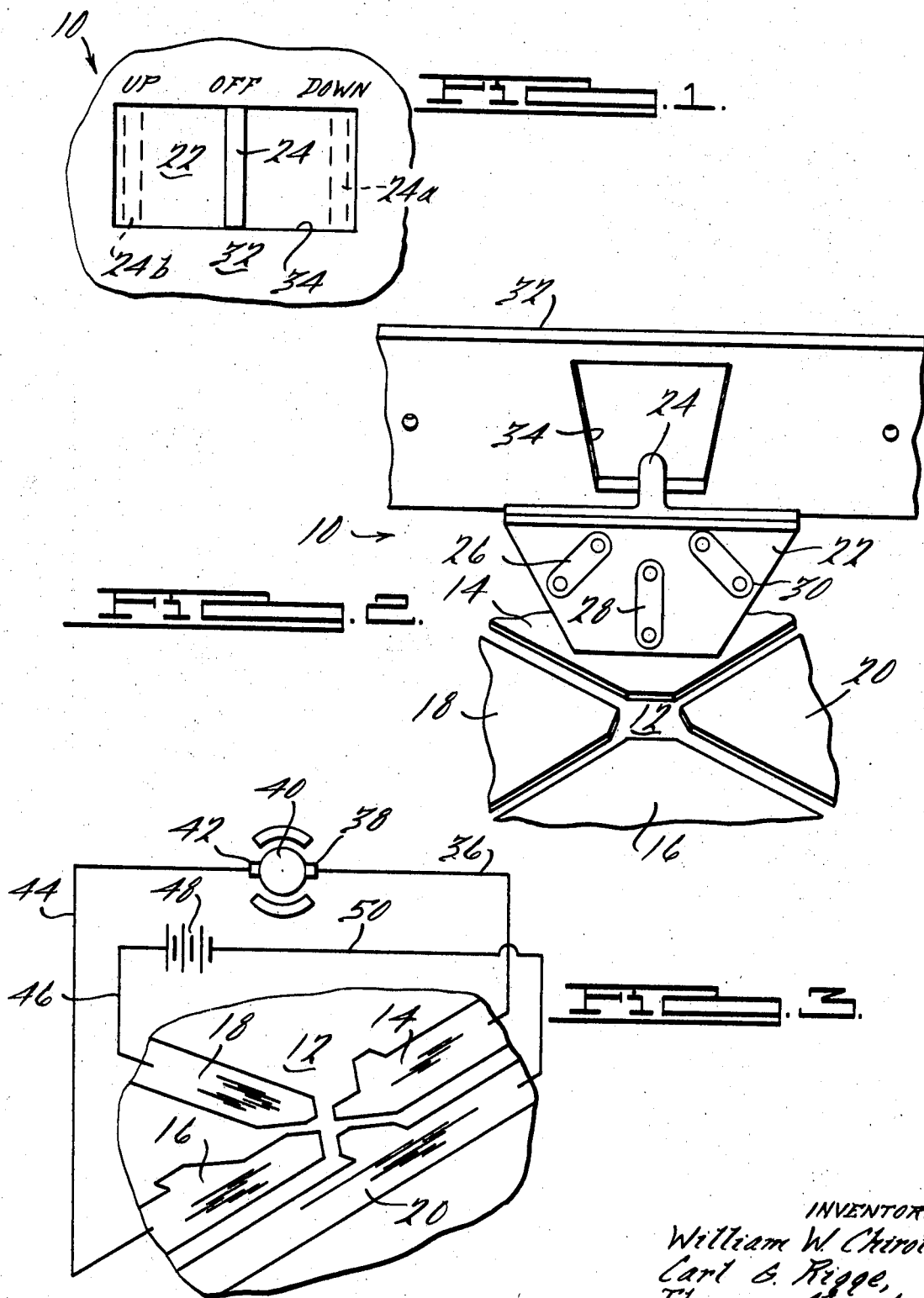

3,564,181

SINGLE PLANE ELECTRIC REVERSING SWITCH FOR MOTOR OPERATION CONTROL

BACKGROUND OF THE INVENTION

It is well known that many utilizations of reversible electric motors require that the motors be braked dynamically upon the cessation of current input to the motors. Such braking allows precise control of motor motivated movement. For example, precise control of the movement of a motor vehicle power window is desirable. Dynamic braking of vehicle power window motors thus is conventional.

A control switch for a dynamically braked, reversible electric motor must be capable of directing electric current from a current source to either of two current input terminals associated with the motor. Also, the control switch must be capable of electrically interconnecting the two motor terminals immediately following the cessation of current flow to the motor in order that the motor be dynamically braked.

Conventional switches having these capabilities have been termed "crossover" switches and are of relatively complex designs. These complex designs render it quite difficult to manufacture economical and physically compact "crossover" switches from conventional switching components. These limitations on switch designs give rise to certain problems attendant the use of such switches.

An example of this may be seen by another reference to motor vehicle power window schemes. In certain instances, motor vehicle design parameters have caused reductions in the dimensions of vehicle doors. Serious problems have arisen as a result of these reductions since the packaging of power window control switches within the reduced size doors has become quite difficult if not impossible.

It is an object of this invention to provide an electric switch to control the reversible operation of an electric motor and to provide dynamic braking for such a motor. The switch of this invention is relatively simple in design, may be manufactured easily and economically and essentially is planar in configuration to minimize packaging problems associated with its use. Furthermore, the switch herein disclosed is adapted for use with printed circuit components without the necessity of an interconnection between such components and separate conductors contained within a switch housing.

SUMMARY OF THE INVENTION

A single plane electric switch constructed in accordance with this invention is operative to direct selectively electric current from a current source to an electric motor to operate the motor, and to connect the motor for dynamic braking. This switch includes a planar circuit mounting member with four flat electrical conductors mounted on the member and lying in a common plane. Portions of each of the conductors converge about a point on the mounting member while being remote from electrical contact with one another. The electric motor is reversible and has a pair of terminals. The first of the conductors is connected to one terminal of the motor and a second of the conductors is connected to the other terminal of the motor. A third of the conductors is connected to one terminal of a current source and the fourth of the conductors is connected to the other terminal of a current source. The orientation of the conductors about the point on the mounting member is such that the first and second conductors are diametrically opposed and the third and fourth conductors are diametrically opposed. A manually movable switch actuator is secured adjacent the mounting member and is adapted to slide adjacent the plane of the conductors. Electrically conductive bridging means are carried by the actuator for movement therewith and are slidable in intimate contact with the conductors. The bridging means have a first position interconnecting the first and third conductors and the second and fourth conductors. This connection operates the motor in a first direction. In a second position, the bridging means interconnect the first and fourth conductors and the second and third conductors to operate the motor in a second direction opposite the first direction. In a third position the bridging means interconnect the first and second conductors to brake dynamically the motor. The third or dynamic braking position of the bridging means is located intermediate the first and second bridging means position.

DESCRIPTION OF THE DRAWINGS

FIG. 1 is a plan view of the exterior of the single plane electric switch assembly of this invention;

FIG. 2 is an exploded view of a switch assembly of this invention;

FIG. 3 is an enlarged view of the conductive circuit leads utilized in the switch of this invention and illustrates schematically the circuit into which these conductive leads electrically are connected;

DETAILED DESCRIPTION OF THE INVENTION

Figure 4:
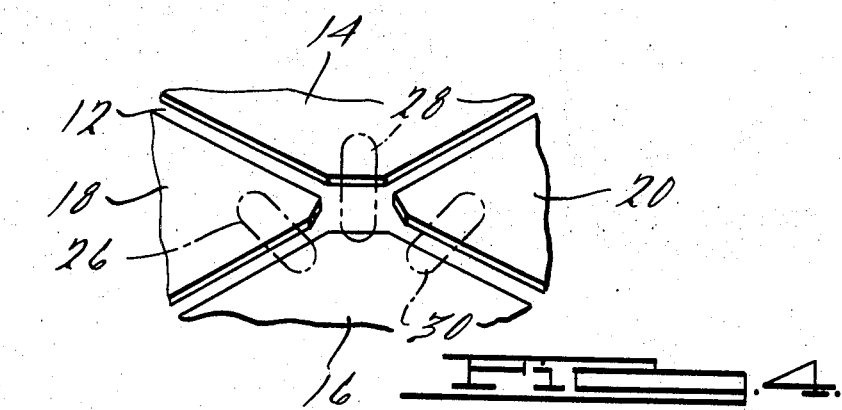
FIG. 4 is a schematic isometric view of the relative positions of the conductive elements of the switch of this invention with said switch in the neutral or dynamic braking position.

Referring now in detail to the drawings and in particular to FIGS. 1 and 2 thereof, the numeral 10 denotes in general a single plane electric switch for motor operation control constructed in accordance with this invention. Switch 10 includes as an integral part thereof a circuit board 12 having a substantially planar configuration upon which are mounted four flat conductors 14, 16, 18 and 20. As best may be seen from FIGS. 2 and 3, these four flat conductors converge about a point on circuit board 12 but are oriented such that electrical contact is not established by virtue of this convergence.

A slide actuator 22 is positioned adjacent circuit board 12 and is adapted to be moved manually by grasping a projection 24 extending upwardly therefrom. The side of actuator 22 remote from projection 24 carries three electrically conductive bridging members 26, 28 and 30. These conductive bridging members are elongated and slide across the flat conductors 14, 16, 18 and 20 upon movement of switch actuator 22.

A planar retaining member 32, having an opening 34 extending therethrough, is positioned over switch actuator 22 to maintain the switch actuator in the position described above. Opening 34, through which projection 24 extends, allows access for a switch operator to projection 24.

Referring now in particular to FIG. 3, there is illustrated the manner in which flat electrical conductors 14, 16, 18 and 20 are connected in circuit with a current source and a reversible electric motor such that reversible operation as well as dynamic braking of the motor are accomplished. An electrically conductive lead 36 interconnects flat conductor 14 and a first terminal 38 of a reversible, permanent magnet, DC motor. A second motor terminal 42 is electrically connected by means of a lead 44 to flat conductor 16. An electrically conductive lead 46 interconnects flat conductor 18 and the positive terminal of a current source 48, such as a battery. The negative terminal of current source 48 is interconnected to flat electrical conductor 20 by a conductive lead 50.

The significance of the arrangements described above initially may be appreciated by reference to FIG. 1 wherein it may be seen that slide actuator 22 may manually be located in three possible positions. In a neutral position, projection 24 of slide actuator 22 is located near the midpoint of aperture 34 in retaining member 22. This position is the one illustrated in solid lines in FIG. 1 and is between the second and third positions 24a and 24b, shown in ghost near the extremities of aperture 34. In FIG. 1, position 24, 24a and 24b bear the legends "off," "down" and "up," respectively. These legends are for illustrative 32 purposes only and correspond to the legends that may be used if switch 10 were utilized as a control switch for a motor vehicle power actuated window.

The relative positions of the electrically conductive bridging contacts 26, 28 and 30 and the flat wire conductors 14, 16, 18 and 20 when actuator 22 is in the "off" or dynamic braking position may be appreciated by reference to FIG. 4 of the drawing. In FIG. 4, it may be seen that with flat actuator 24 at the middle of aperture 34 as illustrated in FIG. 1, central contact 28 interconnects flat wire conductors 14 and 16 such that terminals 42 and 38 of motor 40 are interconnected with one another. It is well known that such an interconnection of the terminals of a reversible, DC motor provide for dynamic braking of the motor if the motor is in movement at the time that such connection is established.

Motor 40 thus may be dynamically braked with slide actuator 22 of motor 10 in the "off" or neutral position. The connections established by contacts 26 and 30 between conductors 16 and 18 and 16 and 20 respectively do not provide for current flow from current source 48 to motor 40.

Figure 5:
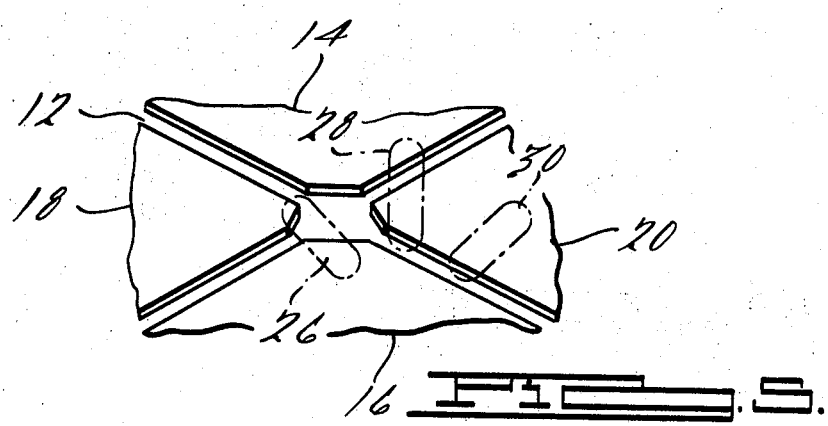
FIG. 5 is a view similar to FIG. 4 but showing the parts with the switch in a position for operating the motor associated therewith in a first direction.

FIG. 5 illustrates the positioning of the bridging contacts relative to the flat conductors with the switch actuator in the ghost position 24a bearing the legend "down." In this position, switch 10 provides for operation of reversible motor 40 in one of two possible motor operation directions. This operation is provided for by the electrical contact established by bridging contacts 26 and 28 between conductors 16 and 18 and 14 and 20, respectively. The positive side of current source 48 thus is connected to terminal 42 of motor 40 through conductor 18, contact 26 and conductor 16. Terminal 38 of motor 40 is connected to the negative side of current source 48 through flat conductors 14, contact 28 and conductor 20. It thus may be seen that with the switch parts in the orientation of FIG. 5, electric current is directed from current source 48 through motor 40.

Figure 6:
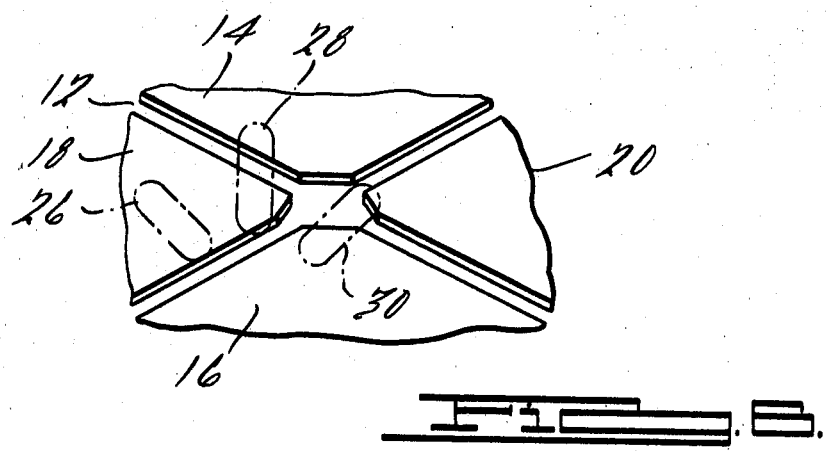
FIG. 6 is a view similar to FIG. 5 but showing the conductive parts of this invention with the switch in a position to operate the motor in a second direction opposite to the direction in which the motor is operated with the parts in the position shown in FIG. 5.

FIG. 6 of the drawings illustrates the positioning of the switch parts with the slide actuator in the position 24b of FIG. 1 that is designated "up." This orientation of the parts of switch 10 provide for motor operation in a direction opposite to the direction of motor operation caused by the positioning of the switch parts as shown in FIG. 5. This reverse operation may be appreciated by reference to the fact that with the parts in the positions shown in FIG. 6, terminal 38 of motor 40 is connected to the positive side of current source 48 through flat conductor 14, contact 28 and flat conductor 18. Terminal 42 of motor 40 is interconnected to the negative side of current source 48 through flat conductor 16, contact 30 and conductor 20.

With the switch parts in either the positions shown in FIG. 5 or the positions shown in FIG. 6, motor 40 is operating at a given speed. When the switch parts are returned to the positions shown in FIG. 4, the interconnection of motor terminals 42 and 30 provides for an immediate dynamic braking of motor movement and the precise control of the parts motivated by motor 40.

It readily may be appreciated from the description given above, that switch 10 is of extremely simple design and easily may be fabricated by well-known methods from readily available materials and parts. Switch 10 essentially is planar with conductors 14, 16, 18 and 20 lying in a plane and conductors 26, 28 and 30 sliding in electrical contact with the flat conductors in this plane. Switch 10 readily is adapted for use with printed circuit arrangements as may be seen from the fact that the flat conductors, across which switching occur, may be printed circuit elements positioned on a printed circuit board and need not be connected to round wires or other conductors that may be present within a switch housing. No such switch housing is included in the design of the switch of this invention.

We claim:
2. Electric switching means operative to direct selectively electric current from a current source to an electric motor to operate said motor and to connect said motor for dynamic braking, said switching means including: a planar circuit mounting member; four flat electrical conductors mounted by said member and lying in a plane, a portion of each of said conductors converging about a point on said mounting member while being remote from electrical contact with one another; said electric motor being reversible and having a pair of terminals; a first of said conductors being connected to one terminal of said motor; a second of said conductors being connected to the other terminal of said motor; a third of said conductors being connected to one terminal of said current source; and the fourth of said conductors being connected to the other terminal of said current source; the orientation of said conductors about said point on said mounting member being such that said first and second conductors are diametrically opposed and said third and fourth conductors are diametrically opposed; a manually movable switch actuator secured adjacent said mounting member and adapted to slide adjacent the plane of said conductors; electrically conductive bridging means comprising three distinct electrically conductive contact members carried by said actuator for movement therewith and slidable in intimate contact with said conductors; said bridging means having a first position interconnecting said first and third conductors and said second and fourth conductors to operate said motor in a first direction, a second position interconnecting said first and fourth conductors and said second and third conductors to operate said motor in a second direction opposite said first direction, and a third position interconnecting said first and second conductors to brake dynamically said motor.